United States Patent [19]
Kreithen et al.

[11] 3,764,781
[45] Oct. 9, 1973

[54] DEVICE FOR INTERCHANGING MEASUREMENT SYSTEMS

[75] Inventors: Marvin L. Kreithen, Huntingdon Valley; John J. Lawler, Newportville, both of Pa.

[73] Assignee: Bridgeport Machines, Inc., Bridgeport, Conn.

[22] Filed: July 10, 1972

[21] Appl. No.: 269,976

[52] U.S. Cl. ............ 235/92 PE, 328/44, 235/92 MP, 235/92 R, 235/92 PL, 235/92 EV
[51] Int. Cl. ............................................ H03k 21/30
[58] Field of Search .................. 235/92 MP, 92 PE, 235/92 DP, 92 PL, 92 DN, 92 EV; 328/44; 307/222 R

[56] References Cited
UNITED STATES PATENTS

| | | | |
|---|---|---|---|
| 3,209,130 | 9/1965 | Schmidt ........................ | 235/92 DN |
| 3,648,030 | 3/1972 | Shepherd et al. ............. | 235/92 EV |
| 3,391,342 | 7/1968 | Gordon et al. ................ | 235/92 EV |
| 3,311,737 | 3/1967 | Soltz et al. .................... | 235/92 PL |

Primary Examiner—Maynard R. Wilbur
Assistant Examiner—Joseph M. Thesz, Jr.
Attorney—Dexter N. Shaw et al.

[57] ABSTRACT

The output from a control means providing pulses representative of English system units is applied to a countermeans, which, as it counts the input pulses applies the count as an output to a memory means. The memory means contains storage locations corresponding to permissible counts of counter to provide a pattern of predetermined fixed relationship between the English and Metric system, such that for each input count a predetermined output in terms of Metric measurement is provided. The memory system also provides means for adjusting the count in the counter and specifically, depending upon the direction of counting, readjusts the counter to zero upon completion of a predetermined number of steps in a repeatable pattern and when counting down skips the counter to the last predetermined count of a finite number of steps in said pattern.

7 Claims, 3 Drawing Figures

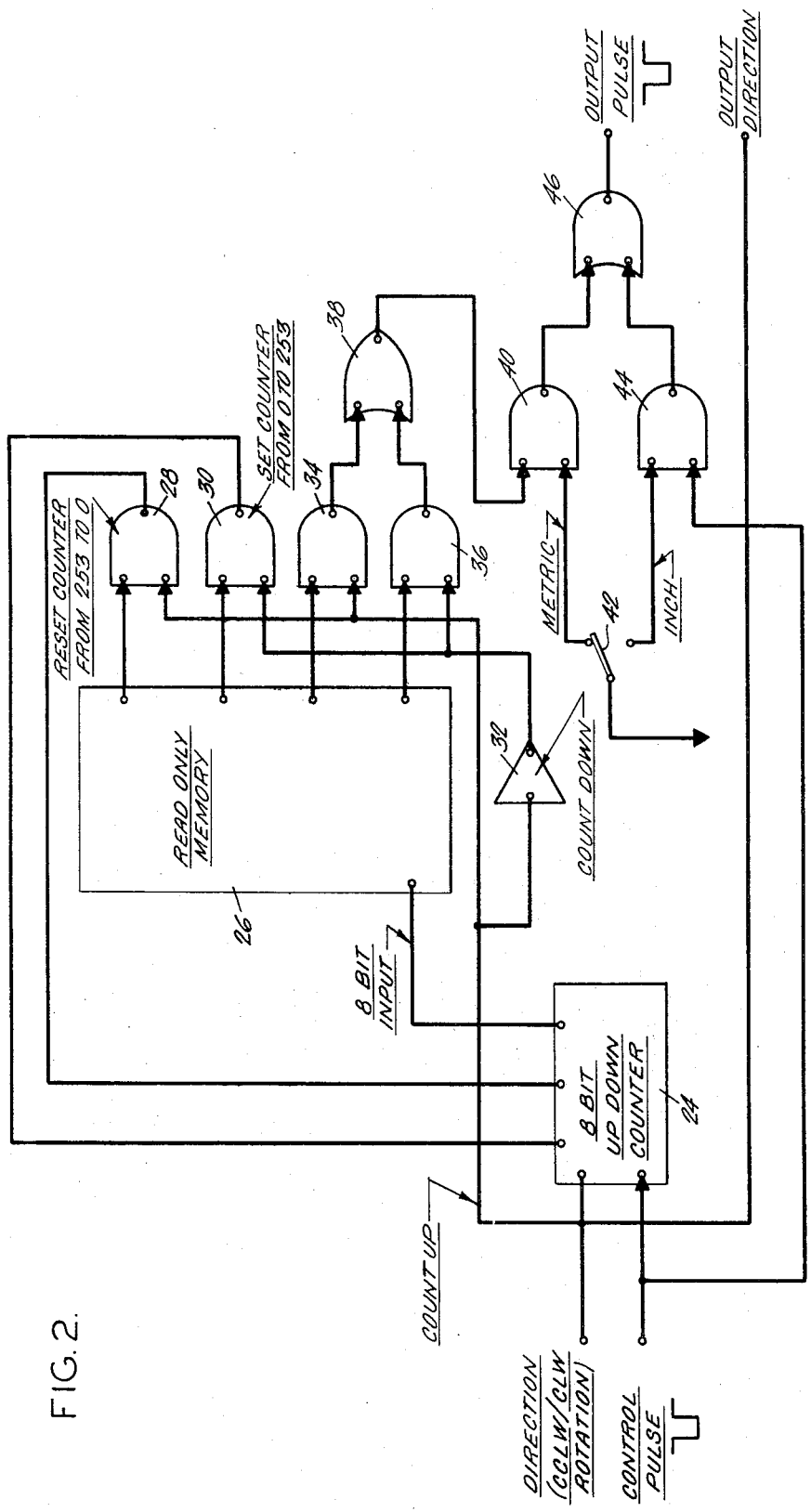

DEVICE FOR INTERCHANGING MEASUREMENT SYSTEMS

This invention relates to a device for applying an output from a control means operated in terms of a first system of measurement to drive means operated in a second system of measurement. More specifically, the present invention relates to a device which may be interposed between control means and drive means to convert automatically from one system of measurement such as the metric system to another system, such as the English system. The device may be optionally included in the system by means of a switch which includes it, or bypasses it, depending upon the system of measurement desired and the path to the output selected.

The mechanical output devices, of which machine tools slides are a good example, must be calibrated in terms of a particular measuring system when they are built. In the United States the measuring system is largely the English system, whereas in much of the rest of the world the measuring system is the metric system. Once built in accordance with one system a machine cannot readily be changed and this has made it difficult in the past to use in Europe a machine tool which has been built in the United States, unless it was originally built in accordance with European specifications. The reverse is also true.

The problem of how to make input information for operating a mechanism calibrated in one system available to operate a mechanism calibrated in another system has existed for many years. Particularly, with the advent of automated machine tools and other automatic mechanisms, it has become increasingly desirable to provide means for using inputs calibrated in one system to drive a mechanism calibrated in another system. Attempts have been made to solve this problem in a number of ways, but proposed means have been complicated or expensive. The present invention is directed to a means which is simple and inexpensive, and yet provides a conversion means permitting transition from one system to another with a minimum of error.

More specifically, the present invention provides a device for applying an output from a control means operating in terms of the first system of measurement to drive means operating in a second system of measurement. The device comprises counter means and memory means. The counter means sequentially receives as input the output of the control means in terms of the first measurement system and accumulates data representing position determined by the control means. The memory means contains the storage locations corresponding to permissible counts of the counter, addressed by the output of the counter means and stores a predetermined fixed relationship between the two measurement systems. Each storage location provides an output in terms of the second system of measurement.

Preferably, the system employs a memory means which contains a fixed finite number of instructions representative of the number of steps in a repeatable pattern relationship between the two measurement systems. The direction of operation is also preferably input into the counter means to determine the output sequence of the counter. The counter means is set at a particular count and instructions are provided in particular storage locations, depending upon the number of steps in the repeatable pattern to provide feedback to the counter means, causing the counter to skip meaningless positions. For example, the memory may provide feedback to the counter means to set the counter to zero when counting up, upon the occurrence of the last of the finite number of instructions. Similarly, the memory may provide feedback to the counter means on the last instruction of the repetitive pattern when counting down upon the occurrence of the first of the finite number of instructions.

For a better understanding of the present invention

FIG. 2 is a block diagram of a preferred metric system/English system convertor.

Figure 1:
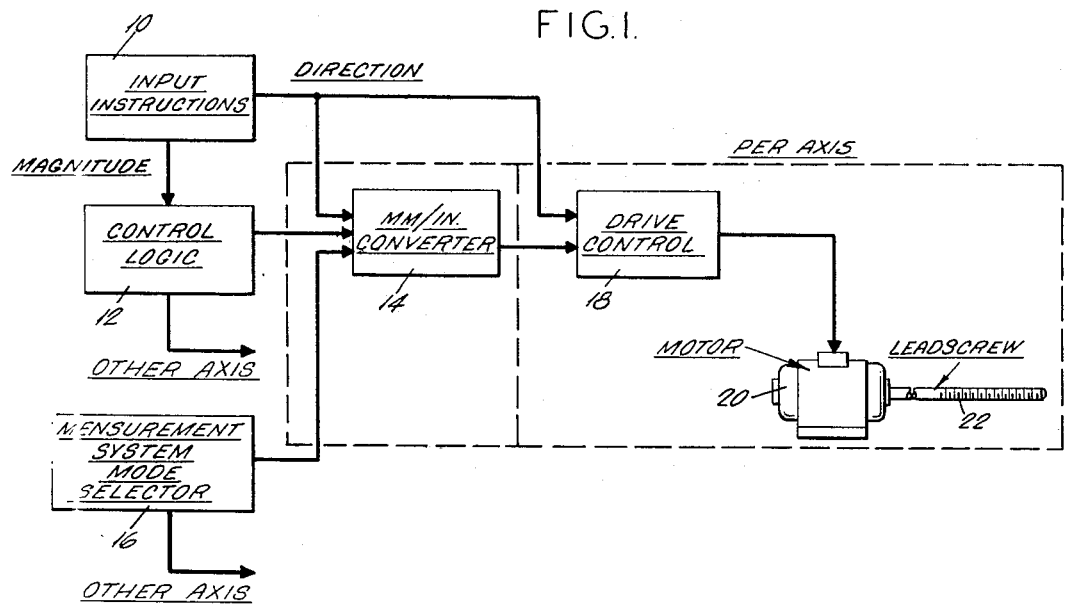
FIG. 1 shows a block diagram of an entire control system in which the device of the present invention is interposed.

Referring to FIG. 1, the generalized block diagram shows a control system for a mechanism such as a machine tool, and particularly shows the elements involved in controlling one axis of a machine tool, it being understood that the system, or a substantial part of the system, is repeated for each axis of motion involved. In an automatic system, input instruction 10, which may be input by way of devices such as punched tape, through a punch tape reader, or the like, will include information about direction and magnitude of the movement being initiated. The magnitude instructions pass through suitable control logic 12. The control logic may be of the type, for example, such as that shown in our co-pending application, Ser. No. 224,752, filed Feb. 9, 1972, for Control System for Producing Multi-Axis Contour Movement for a Stepping Motor Drive. However, the control logic is not limited to this system, or any other system, but has general application, and is particularly useful for systems in which the output is in terms of sequential pulses. The output of the control logic passes through a device 14 in accordance with the present invention for applying an output from a control means operating in terms of a first system of measurement to drive means operating in a second system of measurement. The device 14 may be included, or bypassed by use of a measurement system mode selector 16, which operates on a device similar to 14 for each axis of operation. Similarly, the control logic will feed the similar converter for each axis of operation.

After the output from the device 14 has been converted into terms of the second system, assuming the conversion mode has been selected by mode selector 16, pulses in terms of the second system, which are the output pulses of control logic 12, are fed directly to the drive control 18. It should be understood that an outut pulse as such is not identifiable as originating from either system and to a given motor a pulse always represents identically the same amount of movement in the drive system of the selected axis. The drive control, in turn, controls motor 20, which is preferably a stop motor of the type described in our application Ser. No. 224,752 and the step motor in turn drives a lead screw 22 to move the selected axis. The drive control 18 determines both the magnitude and direction of the drive in accordance with the original input instructions 10, as they may have been modified by device 14.

FIG. 2 shows a block diagram of the device in accordance with the present invention, which is represented as block 14 in FIG. 1. FIG. 2 shows a typical system for conversion from the English system in terms of inches to the metric system in terms of millimeters, for example. As shown in FIG. 2, both a directional signal and a control pulse chain are input into the counter 24. Counter 24 is preferably an 8-bit, up-down counter, which counts up when the forward direction is indicated and down when the backward direction is indicated. The number of control pulses is counted in sequence until the count on the counter is adjusted. The count on the counter is sequentially applied to the memory 26, which is preferably a read-only memory of a standard type having an 8-bit input. The 8-bit input representative of the count on the counter designates a memory address at which output from the memory is determined, which will be explained in some detail hereafter.

The output of the counter 24 may be an up-count or a down-count, depending upon directional information. The memory is preferably provided with a fixed finite number of instructions representative of the number of steps in a repeatable pattern. Whether counting up or down, when the end of that number of instructions is reached the memory is provided with an output program to modify the count on the counter 24. This is done through an AND gate 28 if the counter is counting up. It is done through an AND gate 30, if the counter is counting down. One input to each of these AND gates is from a predetermined memory location, which instructs the counter to change its count. The other input to each of the AND gates is supplied by the directional input, either directly to AND gate 28, in order to reset the counter from the count 253 to 0 in this particular application, or from the same directional source through an inverter 32 to indicate that the count is being counted down. The down-count is applied to the AND gate 30 in order to set the counter from 0 to a count of 253. The output pulses are also fed through AND gates 34 and 36, respectively, from the read-only memory 26. Other inputs to the AND gates 34 and 36 are from the directional instructions, the AND gate 34 being directly from the count-up instruction and the input to gate 36 being from the inverter 32, to represent a count-down instruction. The outputs of AND gates 34 and 36 are provided as inputs to OR gate 38, the output of which passes, in turn, through AND gate 40, the other input of which is a selected potential applied by switch means 42, indicating that a metric output has been selected.

The alternative to a metric output is an English system output through AND gate 44 directly from the control pulse input. Again selection switch means 42 may be placed in the alternate position from the position shown to provide a fixed potential on the other terminal of AND gate 44 to allow control pulses to pass directly from the input through AND gate 44, rather than being converted to a metric system and passing through gate 40. The output of either AND gate 40, or AND gate 44, passing through OR gate 46 provides the system output pulse to the input of the control means drive control 18.

Each output pulse input to drive control 18 produces 0.0005 inch motion of a slide, whether the effect is to be measured in the English or metric mode. This is fixed by the rotation per pulse of the stepmotor and the thread of the screw that drives the table. However, in the metric to inch convertor mode, 0.0005 inch pulses are only output when the error from a calculated metric motion path exceeds 0.00025 inch. In this way, motion of the machine slides closely approximates metric motion. Every 254 pulses output from the control system (representing an input command of 0.254 millimeters) results in two hundred 0.0005 inch stepmotor pulses (equal to 0.100 inches, the inch equivalent of 0.254 mm). Thus, input to the control system in the metric mode can be in decimal powers of a meter. In the above case, the input in the metric mode would be 0.254 millimeters. The input in the inch mode would be 0.100 inches.

The logic required consists of a read-only-memory (ROM) 26 such as SIGNETICS device 8226 and a binary up-down counter 24. The ROM is addressed with an 8-bit input, which represents a binary number from 0 to 255. For each address, the ROM outputs four unique outputs. These outputs are used as follows:

| | |
|---|---|
| Output 1 | Reset counter to 0 |
| Output 2 | Skip counter to 253 |
| Output 3 | Output a pulse weighted at 0.0005" when counting down |
| Output 4 | Output a pulse weighted at 0.005" when counting up |

Figure 3:
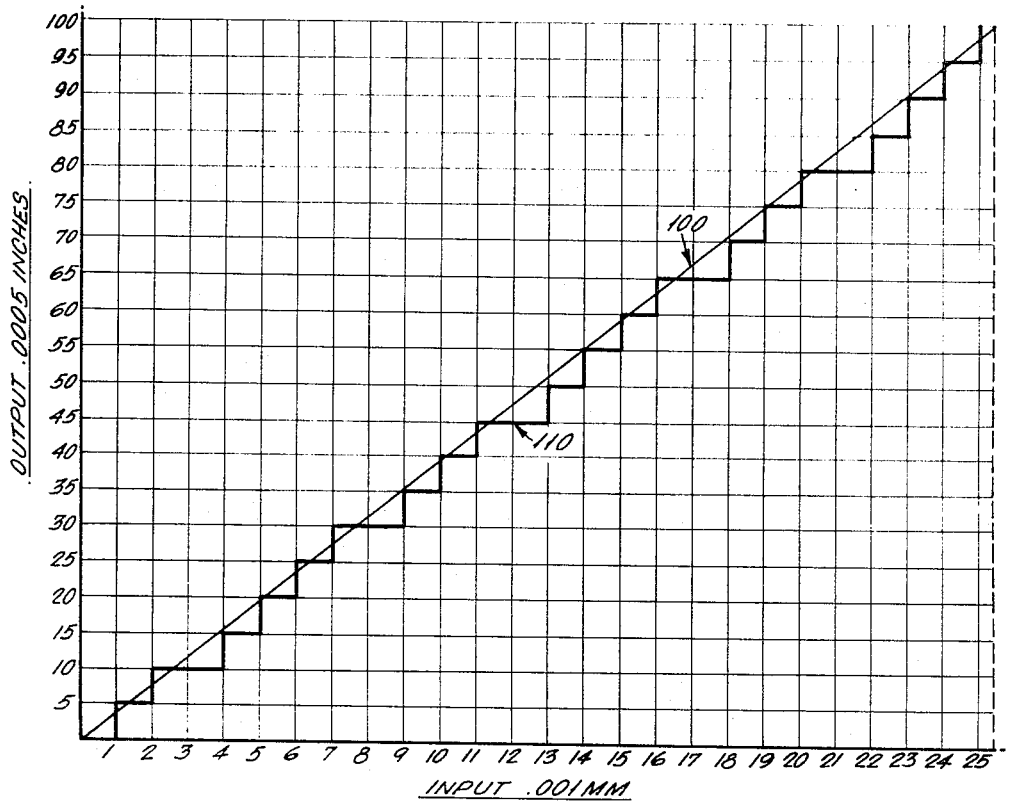
FIG. 3 is a chart showing the relative occurrence of output pulses in one system relative to the occurrence of input pulses in another system.

For example,

Referring to FIG. 3, each control pulse in the metric mode represents motion of 0.0003937 inch. (English system). Each output pulse, which is fixed by the mechanical calibration of the machine slide with respect to the English measurement system, represents 0.0005 inch motion. Line 100 shows the trace of the theoretical metric/English conversion path. After each 0.001 millimeter input pulse, from the control logic, a decision made previously and stored in memory means 26 about whether or not to output a 0.0005 inch step to the drive means determines whether or not a pulse is output to the drive control from memory. This decision was based on the actual deviation from the theoretical path. When the actual deviation exceeded 0.00025 inch, an output pulse was programmed to be generated from memory. The resultant path 110 closely approximates the theoretical path. In practical application the resultant error is less than most machining tolerances. If closer tolerances are required the weight of the output pulse can be reduced from 0.0005 to 0.00025 inch, etc.

The following table shows how decisions to output pulses are arrived at when cumulative figures shown represent measurements in 0.0000001 inches:

| Control Pulse | Cumulative Input | Error before Output Move | Output* | Cumulative Output |
|---|---|---|---|---|
| 1 | 3937 | 3937 | 1 | 5000 |
| 2 | 7874 | 2874 | 1 | 10000 |
| 3 | 11811 | 1811 | 0 | 10000 |
| 4 | 15748 | 5748 | 1 | 15000 |
| etc. | | | | |

* 1 represents a step; 0 no step

At the 254th input control pulse (over 10 times as many steps as shown in FIG. 3), the error will be 0 and the pattern above will repeat. The OUTPUT pattern generated above becomes a decision table programmed into the read-only memory.

Since the binary up-down counter normally counts 256 pulses (2 to the eighth power), two additional outputs are programmed into the read only memory. When counting down from 0, the output from the ROM causes the counter to skip down to 253. When counting up from 253, the output of the ROM causes the counter to reset to 0. This enables skipping over the two superfluous addresses of the ROM.

A preferred embodiment has been described. It will be clear to those skilled in the art that other embodiments are possible within the scope of the claims appended hereto. All embodiments are intended to be within the scope and spirit of the present invention.

We claim:

1. An English/Metric dimensional converter for converting an input to a control means in terms of one of said systems of measurement to a machine tool drive operating in and responding to the other system of measurement comprising:

counter means for receiving as an input the output of the control means in terms of said one measurement system and accumulating data representing position determined by the control means; and memory means containing a fixed finite number of instructions representative of the number of steps in a repeatable pattern relationship between the two measurement systems in storage locations corresponding to permissible counts of the counter means, addressed by the output of the counter means, storing a predetermined fixed relationship between the one measurement system to the other in each storage location providing an output in terms of the other system of measurement, said memory means also containing instructions in particular storage locations, dependent upon the number of step in the repeatable pattern, to provide feedback to the counter means causing the counter to skip meaningless positions.

2. The device of claim 1 in which the direction of operation is input into the counter means to determine the output sequence of the counter.

3. The device of claim 2 in which the counter means may be set at a particular count and in which instructions in particular storage locations, dependent upon the number of steps in the repeatable pattern and direction of operation, provide feedback to the counter means causing the counter to skip meaningless positions.

4. The device of claim 3 in which the feedback to the counter means sets the counter means to zero when counting up upon the occurrence of the last of the finite number of instructions.

5. The device of claim 3 in which the feedback to the counter means sets the counter means to the last instruction of the repetative pattern when counting down upon the occurrence of the first of the finite number of instructions.

6. The device of claim 1 in which the memory means is a read only memory.

7. The device of claim 1 in which switching means is provided to connect through said device in order to enable operation in the second system of measurement or to bypass said device to operate in the first system of measurement.

* * * * *

UNITED STATES PATENT OFFICE
CERTIFICATE OF CORRECTION

Patent No. 3,764,781           Dated October 9, 1973

Inventor(s) Marvin L. Kreithen and John J. Lawler

It is certified that error appears in the above-identified patent and that said Letters Patent are hereby corrected as shown below:

Column 2, line 10, after "invention" insert --reference is made to the accompanying drawings, in which--.
Column 2, line 59, delete "stop" and substitute --step--.
Column 5, line 30, delete "step" and substitute --steps--.

Signed and sealed this 26th day of February 1974.

(SEAL)
Attest:

EDWARD M. FLETCHER, JR.　　　　C. MARSHALL DANN
Attesting Officer　　　　　　　　Commissioner of Patents